United States Patent [19]
Downing et al.

[11] Patent Number: 5,220,616
[45] Date of Patent: Jun. 15, 1993

[54] IMAGE PROCESSING

[75] Inventors: Anthony H. Downing, Saffron Waldon; Robert G. Hadingham; John Whitaker, both of Harlow; Jeremy B. D. Fonseca, New Barnet, all of United Kingdom

[73] Assignee: Northern Telecom Limited, United Kingdom

[21] Appl. No.: 843,906

[22] Filed: Feb. 27, 1992

[30] Foreign Application Priority Data

Feb. 27, 1991 [GB] United Kingdom ............... 9104166

[51] Int. Cl.⁵ .......................................... G06K 9/40
[52] U.S. Cl. ..................................... 382/54; 358/448; 358/457; 382/27
[58] Field of Search ............. 382/27, 56, 54, 42; 358/447, 463, 457, 448

[56] References Cited

U.S. PATENT DOCUMENTS

| | | | |
|---|---|---|---|
| 4,754,492 | 6/1988 | Malvar | 382/41 |
| 4,860,373 | 8/1989 | Hartless et al. | 382/27 |
| 4,941,043 | 7/1990 | Jass | 358/133 |
| 5,101,445 | 3/1992 | Call et al. | 382/27 |
| 5,119,445 | 6/1992 | Suzuki et al. | 382/27 |

FOREIGN PATENT DOCUMENTS 0107426 6/1984 European Pat. Off.

OTHER PUBLICATIONS

Nachrichten Technik Elektronik-vol. 38, No. 5, May 1988, Berlin DD pp. 166-169, L. Arnold et al. "Adaptiv Transformationscodierung von Grauwertbildern mit vermindertem Blocking Effect", Section 3.2 pp. 168-149, FIG. 10.

*Primary Examiner*—Joseph Mancuso
*Attorney, Agent, or Firm*—Lee, Mann, Smith, McWilliams, Sweeney & Ohlson

[57] ABSTRACT

A method of digitally processing images, in the form of a two dimensional data element array, in which the image is compressed by dividing the array into blocks (2) and performing transformation thereon. In order to smooth discontinuities at the boundaries (1, 13, 3, 14) between the blocks (2) resulting from the compression, filtering is performed by sequentially scanning elements at the boundaries with a one dimensional operator matrix (6, FIG. 1). The matrix applies suitable weights to those elements and adjacent ones to effect smoothing.

5 Claims, 2 Drawing Sheets

IMAGE PROCESSING

SUBJECT OF THE INVENTION

This invention relates to image processing and in particular to digital image processing.

BACKGROUND OF THE DISCLOSURE

To digitally process an image it is first necessary to reduce the image to a series of digitised numbers, i.e. a data array, that can be manipulated by computing means. Each number represents the brightness value at a particular location and is called a picture element or pixel. Once digitised, various operations can be performed on the image by the computing means, such as enhancement, restoration or compression. Compression of an image is a way of representing the image by fewer numbers.

Image compression has been recognised as an important enabler in the next generation of Information Technology products which will incorporate video-phones, desk top presentations and interactive video etc. This has led to standards being promulgated which are based on the Discrete Cosine Transform (DCT), currently the most efficient general purpose compression technique, although there are others. A particular standard (draft CCITT document number 396 "Description Reference Model 7 (RM7)" describes a compression scheme suitable for the transmission of medium resolution (360×288 pixels) black and white and colour images at up to 30 frames per second over ISDN 64 Kbit/sec links. Similar techniques can be used to transmit lower resolution low bit rate images over standard telephone lines (PSTN).

Images to be compressed are divided into blocks of say 8×8 or 16×16 pixels and the transformation is performed on the block. The use of blocks ensures local pixel correlation and additionally limits the size of the transform coefficients. However, when high compression ratios are implemented the block boundaries becomes distinct in the image presented to the viewer and in the extreme case they are visually disturbing. This situation is further aggravated by the motion compression techniques which selectively refresh blocks where movement of an image part has occurred, that is the whole image information is not transmitted all of the time but only that relating to changes. Filtering of the image can be used to remove the block discontinuities. Filtering in this context means "averaging" a pixel value with its neighbours, with the possible application of weights to the values first.

Image filtering, to remove noise etc, is normally achieved by scanning a small 3×3 operator matrix, set of values, or mask, over the image i.e. convolving the operator matrix with the data array, the elements of the data array being sequenctially scanned by the operator matrix. The operator matrix is substantially smaller than the data array. For each pixel point the values of its 8 neighbours are weighted together with itself to create a new averaged (smoothed) value. When applying this to images to remove block discontinuities (boundaries) detail is lost from the whole image rather than just at the boundaries. The block discontinuity problem can be overcome by a technique involving overlapping the block edges but this is very complicated and involves considerable computing effort. Hence it is particularly unsuitable for PSTN type applications where costs and computing power should be minimised as far as possible.

SUMMARY OF THE INVENTION

According to the present invention there is provided a method of digitally processing an image in the form of a two-dimensional data array having elements arranged in rows and columns, wherein the image is compressed by dividing the array into blocks and performing transformation on the blocks, and wherein the image is filtered by convolution with an operator matrix substantially smaller than the array, characterised in that the filtering is used to smooth discontinuities, at boundaries between said blocks, resulting from said compression, and comprises sequentially scanning elements of the data array at the data array block boundaries with a one dimensional operator matrix.

BRIEF DESCRIPTION OF THE DRAWINGS

Embodiments of the invention will now be described with reference to the accompanying drawings in which.

BRIEF DESCRIPTION OF THE PREFERRED EMBODIMENT

Figure 1:
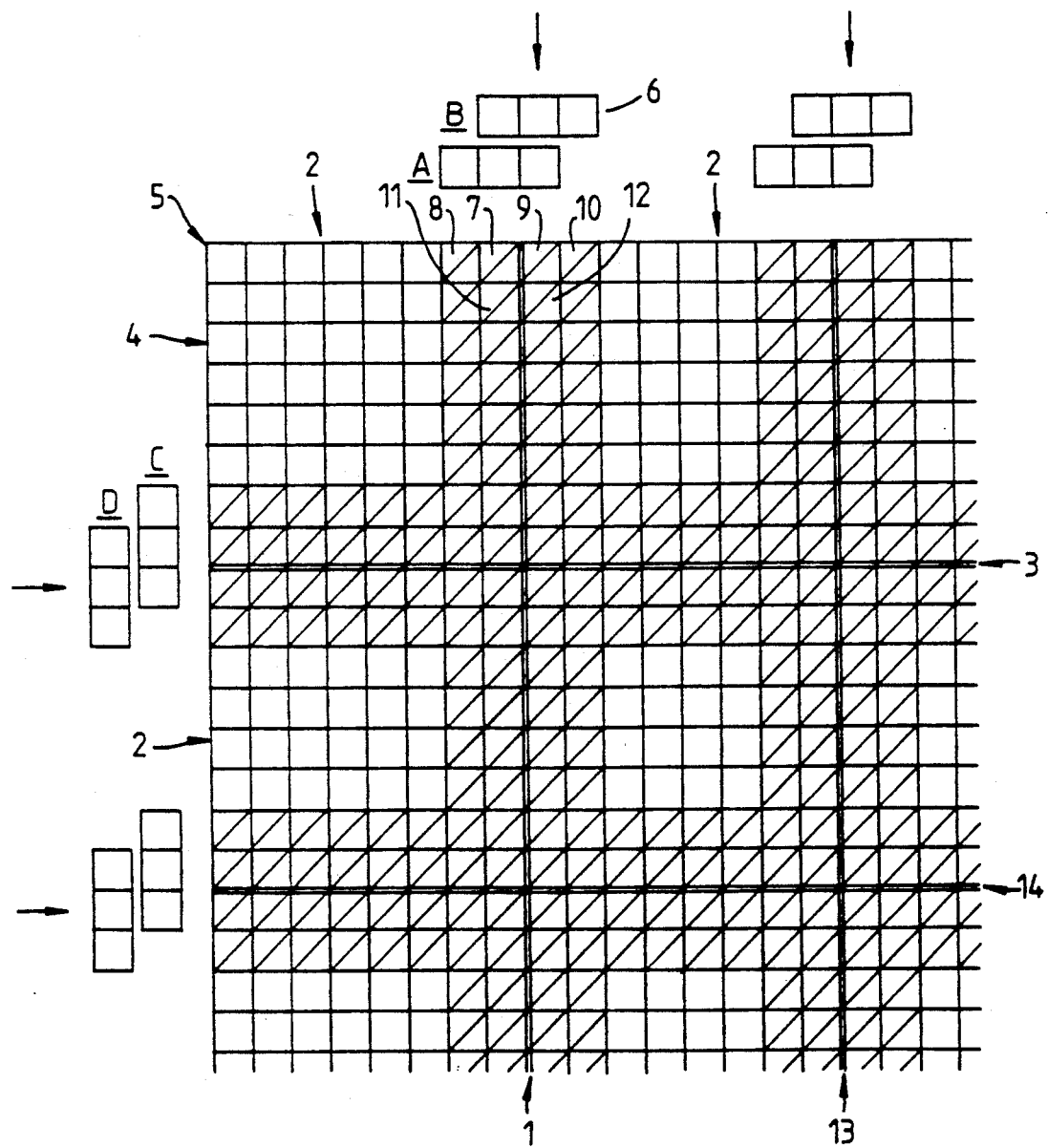
FIG. 1 shows part of an array of 8×8 pixel blocks.

In FIG., 1 there are vertical boundaries 1, 13 between 8×8 pixel blocks 2 and horizontal boundaries 3, 14. It is at these boundaries that the block discontinuities referred to above occur. If conventional image filtering using a 3×3 operator matrix is employed for every pixel there are clearly special cases to be considered when the pixel in question is at the image edge, such as 4, or at an image corner, such as 5, since there are not then the 8 pixel neighbours required.

The present invention proposes the use of a one dimensional filter, namely a row operator matrix 6, for example comprised of three values at windows corresponding to pixels i.e. a 3×1 matrix. This filter is scanned over the elements at the block boundaries as follows, for example.

Consider the vertical block boundary 1, the filter is first "applied" so that its central value corresponds to pixel 7 of the image (position A) and a weighted version of the value of that pixel 7 is taken together with weighted versions of the values of the adjoining pixels 8 and 9 to produce the smoothed value for pixel 7. The filter positions are indicated at the side of the image, rather than over it, for clarity. In use they are "superimposed", however, on the array and scanned thereover. If the weights are m for the boundary pixel 7 in question and n and p for its neighbours 8 and 9, respectively, and $i_7$, $i_8$ and $i_9$ are the values of these pixels, then the smoothed value of pixel 7 is $(mi_7 + ni_8 + pi_9)/(m+n+p)$. The filter is then "moved" one pixel sideways (to position B) in order to operate on boundary pixel 9 and its neighbours 7 and 10, again using the original value of pixel 7. Using the same weights as before i.e. m for pixel 9, n for pixel 7 and p for pixel 10, the smoothed value of pixel 9 is given by $$(mi_9 + ni_7 + pi_{10})/(m+n+p)$$

Typical smoothing weights are the values $m=2$, $n=1$ and $p=1$.

This procedure is repeated for pixels 11 and 12 and so on down the vertical block boundary 1 and subsequently down other vertical block boundaries such as 13. The horizontal block boundary 3 and others such as 14 are treated similarly by using the vertical neighbours to the boundary pixels, "disposing" the filter first in position C and then position D. An alternative procedure would be to scan (sweep) the filter first down one boundary edge (pixels 7, 11 etc) and subsequently down the adjoining edge (pixels 9, 12 etc) but this would involve extra processing. Since the values of pixel 7 and pixel 9 are available after one application of the filter it is more "economic" to re-use them to calculate the smoothed value of pixel 9.

It will be apparent that use of such a one-dimensional filter achieves computational savings over the 3×3 matrix since there are no special cases to be considered at the image edge and corners, there are fewer pixel values (only those which are illustrated hatched) to be accessed, and the weighting calculation is greatly simplified. Experiments have shown that a one dimensional filter applied horizontally to the vertical boundaries and vertically to horizontal boundaries produces very acceptable results, removing discontinuities at block boundaries but not removing too much detail at subjectively important areas such as eyes and mouths whilst retaining details in the centre of blocks since their values are unaffected. In addition, the one dimensional filter proved to be three times faster than the equivalent two dimensional filter. Whilst a three element operator matrix (one dimensional filter) has been specifically described above, a filter with more than three elements, for example five, could alternatively be used.

Figure 2:
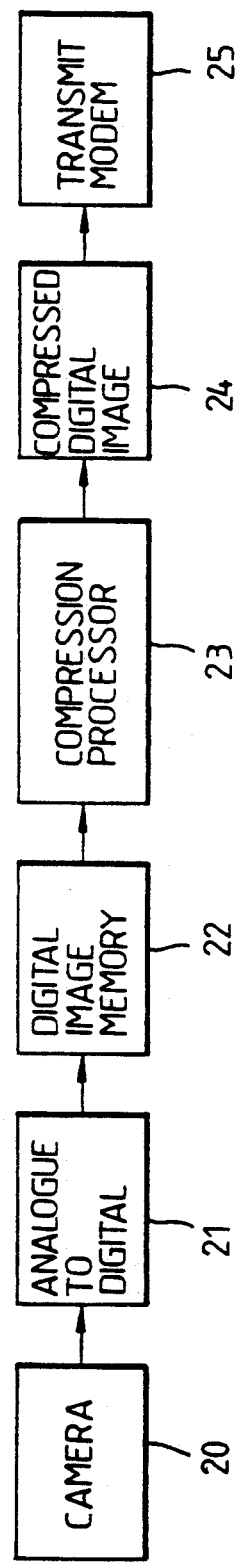
FIG. 2 shows a transmitter in schematic form and
FIG. 3 shows a receiver in schematic form.
Figure 3:
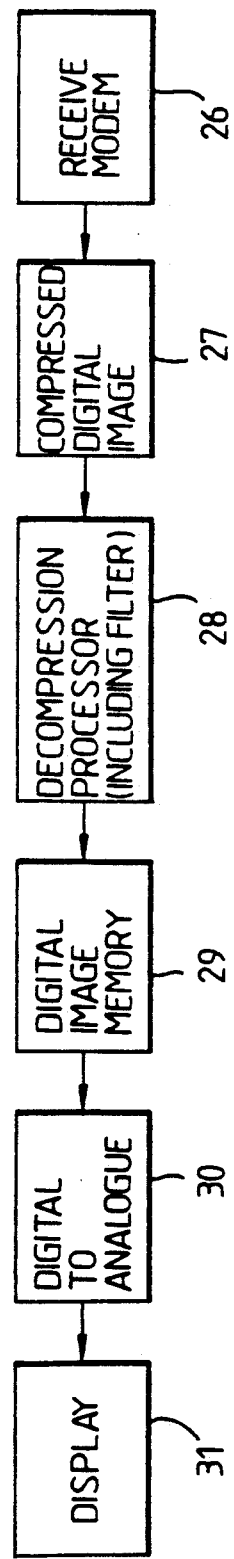

The filtering technique described above may be used, for example, in a video-telephony application. The apparatus basically consists of two distinct elements, the transmitter (FIG. 2) and the receiver (FIG. 3). For video-telephony both elements would be present at each site in order to allow two way video communication.

Considering the transmitter (FIG. 2), a camera 20 produces an analogue waveform corresponding to the scene before it. This waveform is digitised by an analogue to digital converter 21 and placed into a digital image memory 22 as a two dimensional data array. A compression processor 23 converts this data from the spatial to the frequency domain. Generally all frequencies are not present within an image and therefore only a limited number of frequencies need be transmitted. Further compression can be achieved by transmitting only those frequencies found to be significant to the human visual system. This reduced frequency data (compressed digital image 24) is coded by variable length codes and transmitted by a transmit MODEM 25 (modulator/demodulator).

Considering the receiver, receive MODEM 26 receives the compressed digital image. The frequency information is extracted at 27 from the variable length codes and converted into spatial information representing the image. Filtering, as described above, is then applied at 28 to this reconstructed image. The digital image data at 29 is then converted at 30 to an analogue waveform for display at 31 on a video monitor.

Thus the invention proposes applying a one dimensional filter along the block boundaries, both horizontal and vertical, of an image produced by a block compression technique. This allows intra-block image detail to be retained and the greatly reduced memory fetches increase image throughput in comparison with conventional techniques.

We claim:

1. A method of digitally processing an image in the form of a two-dimensional data array having elements arranged in rows and columns, wherein the image is compressed by dividing the array into blocks and performing transformation on the blocks, and wherein the image is filtered by convolution with an operator matrix substantially smaller than the array, characterised in that the filtering is used to smooth discontinuities, at all boundaries between said blocks including at adjacent corners of the blocks, resulting from said compression, and comprises sequentially scanning elements of the data array at all the data array block boundaries with a one dimensional operator matrix, and in that the one dimensional operator matrix is first scanned over the block boundaries extending in one direction and then over the block boundaries extending in the orthogonal direction.

2. A video-telephone employing an image processing method as claimed in claim 1.

3. A method as claimed in claim 1 characterised in that the operator matrix is applied first to smooth an array element value on one side of said boundary and then applied to smooth the adjacent array element value on the opposite side of the said boundary.

4. A method as claimed in claim 1 characterised in that the operator matrix is comprised of three elements.

5. A method as claimed in claim 4 wherein the operator matrix serves to apply respective weights to an array element on one side of a said boundary, the array element adjacent thereto in the same block and the array element thereto in the neighbouring block, which array elements are disposed in a line orthogonal to the said boundary.

* * * * *